United States Patent [19]
Ishida et al.

[11] Patent Number: 5,569,854
[45] Date of Patent: Oct. 29, 1996

[54] APPARATUS AND METHOD FOR TRANSMITTING AND RECEIVING ULTRASONIC WAVES HAVING AN ACOUSTOELECTRIC, ULTRASONIC TRANSDUCER

[75] Inventors: Yoshihiko Ishida, Nagoya; Makoto Tani, Inazawa, both of Japan

[73] Assignee: NGK Insulators, Ltd., Japan

[21] Appl. No.: 469,995

[22] Filed: Jun. 6, 1995

[30] Foreign Application Priority Data

Oct. 4, 1994 [JP] Japan .................... 6-239814

[51] Int. Cl.$^6$ ................................. G01N 29/04
[52] U.S. Cl. ........................................ 73/628
[58] Field of Search ............... 73/628, 632, 647, 73/609, 602; 364/508; 367/140, 157; 310/322

[56] References Cited

U.S. PATENT DOCUMENTS

| | | | |
|---|---|---|---|
| 3,353,926 | 11/1967 | Kolb | 111/71 |
| 4,195,244 | 3/1980 | Heyman | 310/311 |
| 5,345,427 | 9/1994 | Ishida | 367/140 |

FOREIGN PATENT DOCUMENTS

| | | |
|---|---|---|
| 0 564 239 | 10/1993 | European Pat. Off. . |
| 2 379 495 | 9/1978 | France . |
| 1 616 606 | 4/1970 | Germany . |

OTHER PUBLICATIONS

Japanese Journal of Applied Physics, Supplements, vol. 24, 1985, Tokyo, Japan, pp. 69–71, Noboru Sakagami "Hydrothermal Growth and Stoichiometric Assessement of ZnO Single Crystals of High Purity", p. 70, right column (no month).

Journal of the American Ceramic Society, vol. 47, No. 1, Jan. 1964, pp. 9–12, R. A. Laudise et al. "Hydrothermal Growth of Large Sound Crystals of Zinc Oxide", p. 11, right column.

J. S. Heyman & J. H. Cantrell, Jr., "Application of an Ultrasonic Phase Insensitive Receiver to Material Measurements", 1977 Ultrasonics Symposium Proceedings, IEEE Cat., pp. 124–128.

J. S. Heyman, "Phase Insensitive Acoustoelectric Transducer", J. Acoust. Soc. Am., Jul. 1978, pp. 243–249.

Primary Examiner—Hezron E. Williams
Assistant Examiner—Christine K. Oda
Attorney, Agent, or Firm—Parkhurst, Wendel & Burr, L.L.P.

[57] ABSTRACT

An apparatus for transmitting and receiving ultrasonic waves has a transmitter for sending a pair of ultrasonic waves to a sample. The pair of ultrasonic waves have substantially symmetric waveforms with respect to zero sound pressure. One of the ultrasonic wave is separated from the other ultrasonic wave. An acoustoelectric, ultrasonic transducer receives the pair of ultrasonic waves affected by the sample. The acoustoelectric, ultrasonic transducer converts the pair of ultrasonic waves into a pair of electric signals accompanied by phonon-charge carrier interaction. Each of the electric signals includes an acoustoelectric signal insensitive to phase and a piezoelectric signal sensitive to phase. A processing device processes the pair of electric signals so as to remove the piezoelectric signal and obtain the acoustoelectric signal. The initial ultrasonic waves have opposite phase so that superimposition of the pair of electric signals by the processing device offsets the piezoelectric signals, thereby obtaining the acoustoelectric signals.

20 Claims, 5 Drawing Sheets super-
imposition

APPARATUS AND METHOD FOR TRANSMITTING AND RECEIVING ULTRASONIC WAVES HAVING AN ACOUSTOELECTRIC, ULTRASONIC TRANSDUCER

BACKGROUND OF THE INVENTION

1. Field of the Invention

The present invention relates to an apparatus and a method for transmitting and receiving ultrasonic waves having an acoustoelectric, ultrasonic transducer.

2. Description of Related Art

An ultrasonic transducer converts ultrasonic waves into an electric signal. A piezoelectric, ultrasonic transducer includes a piezoelectric element, and the piezoelectric element produces an electric signal when subjected to pressure or strain induced by ultrasonic waves. The electric signal converted by the piezoelectricity is sensitive to phase of ultrasonic waves. The electric signal is alternating, and its frequency depends on that of ultrasonic waves.

Recently, acoustoelectric, ultrasonic transducers have received attention. Some piezoelectric semiconductors are acoustoelectric, converting ultrasonic waves into an electric signal accompanied by phonon-charge carrier interaction. In contrast to the piezoelectric transducer, the electric signal converted by the acoustoelectricity is insensitive to phase of the ultrasonic waves, and the electric signal is not alternating.

Ultrasonic transducers are used in a variety of nondestructive tests. The acoustoelectric, ultrasonic transducer is superior to the piezoelectric, ultrasonic transducer in some applications where ultrasonic waves received by the ultrasonic transducer have phase distortion. In such applications, piezoelectric, ultrasonic transducers tend to be erroneous whereas acoustoelectric, ultrasonic transducers are accurate, not affected by the phase distortion. This is the case, for example, in measuring a thickness of a sample having a cylindrical shape, and a rough radial surface and in detecting defects inside a composite material.

However, in reality, acoustoelectric, ultrasonic transducers do not give only an acoustoelectric signal, but a mixture of an acoustoelectric signal and a piezoelectric signal, wherein an acoustoelectric signal is insensitive to the phase of ultrasonic waves received by the transducer, and a piezoelectric signal is sensitive to the phase of ultrasonic waves received by the transducer. Therefore, it has been a problem in acoustoelectric, ultrasonic transducers to isolate the acoustoelectric signal from the piezoelectric signal.

Japanese Patent Application Laid-Open No. 5-72579 discloses an apparatus having a transmitter for sending ultrasonic waves into a sample, an acoustoelectric, ultrasonic transducer for receiving ultrasonic waves reflected by the sample, and an electric frequency filter. The electric frequency filter removes the piezoelectric signal in the output signal of the acoustoelectric, ultrasonic transducer so as to give the acoustoelectric signal. The piezoelectric signal has a higher frequency corresponding to ultrasonic waves whereas the acoustoelectric signal has a lower frequency. Therefore, the electric frequency filter removes the electric signal having a higher frequency, thereby selecting the acoustoelectric signal having lower frequency.

However, as an energy of ultrasonic waves received by the acoustoelectric, ultrasonic transducer decreases, the acoustoelectric, ultrasonic transducer gives a smaller ratio of the acoustoelectric signal and a larger ratio of the piezoelectric signal. The acoustoelectric signal is proportional to the energy of ultrasonic waves whereas the piezoelectric signal is proportional to the square root of the energy of ultrasonic waves. When ultrasonic waves have a small energy, the electric frequency filter may not sufficiently remove the large piezoelectric signal, compared to the small acoustoelectric signal.

Moreover, in the apparatus of Japanese Patent Application Laid-Open No. 5-72579, which belongs to a so-called pulse-echo type, the acoustoelectric, ultrasonic transducer for receiving ultrasonic waves has a thickness several times greater than the wavelength of the ultrasonic waves so as to increase the difference in frequency between the acoustoelectric signal and the piezoelectric signal. The acoustoelectric signal has a longer duration time, decreasing time resolution thereof.

Japanese Patent Application No. 6-59093 discloses an acoustoelectric, ultrasonic transducer having an interference layer thereon so as to give a time lag to a portion of ultrasonic waves received by the acoustoelectric, ultrasonic transducer, thereby reducing the piezoelectric signal. Typically, the portion of the ultrasonic waves delays by a half the period thereof whereas the other portion of the ultrasonic waves do not have any delay, thereby offsetting the phase of each other. The acoustoelectric, ultrasonic transducer can selectively detect the acoustoelectric signal even from ultrasonic waves having a limited energy.

However, the decrease in the piezoelectric signal by the interference layer depends on the frequency of the ultrasonic waves received. Therefore, where ultrasonic waves having a mixture of frequencies are received by the acoustoelectric, ultrasonic transducer, the transducer needs a plurality of the interference layers corresponding to the frequencies so as to reduce the piezoelectric signal.

The ultrasonic waves may need to have homogeneous sound field so as to sufficiently decrease the piezoelectric signal by the interference layer. The interference layer has a receiving surface for receiving ultrasonic waves, and the receiving surface may not have a shape complementary to the sound field of the ultrasonic waves. For example, the ultrasonic waves may strike the receiving surface with a small angle; ultrasonic waves may have a time lag in striking the interference layer; and ultrasonic waves may have intensity modulation. In these cases, the piezoelectric signal may not sufficiently decrease.

In the pulse-echo method, typically, an ultrasonic wave having a duration of one to several periods is transmitted to a sample, and the interference layer cannot decrease the piezoelectric signal of the first half period and the last half period of the ultrasonic wave.

SUMMARY OF THE INVENTION

An object of the present invention solves the aforementioned problem by providing an apparatus and a method which are independent of frequency of ultrasonic waves and homogeneity of sound field.

In related art, the electric frequency filter and the interference layer remove the piezoelectric signal through the process of receiving ultrasonic waves by the acoustoelectric, ultrasonic transducer. In the present invention, however, ultrasonic waves transmitted to a sample have features so as to facilitate processing of electric signals converted by the acoustoelectric, ultrasonic transducer.

In the present invention, a transmitter sends a pair of ultrasonic waves to a sample, and the pair of the ultrasonic waves have substantially symmetric waveforms with respect to a zero sound pressure. In other words, the superimposition of the pair of ultrasonic waves offsets or cancels the phase of the ultrasonic waves, thereby the electric signal converted by the acoustoelectric, ultrasonic transducer offsets or cancels the phase, isolating the acoustoelectric signal.

One of the ultrasonic waves is separated from the other ultrasonic wave. Only after one of the ultrasonic waves is transmitted, the other complementary ultrasonic wave is transmitted to the sample so as to prevent the overlap of the pair of ultrasonic waves. While the transmitter is sending one of the ultrasonic waves, the transmitter does not send the other complementary ultrasonic wave.

An acoustoelectric, ultrasonic transducer receives the pair of ultrasonic waves affected by the sample. The acoustoelectric, ultrasonic transducer converts the pair of ultrasonic waves into a pair of electric signals accompanied by phonon-charge carrier interaction. Each of the electric signals includes an acoustoelectric signal that is insensitive to phase and a piezoelectric signal that is sensitive to phase.

A processing device processes the pair of electric signals so as to remove the piezoelectric signal and obtain the acoustoelectric signal. Typically, the pair of electric signals may be added so that the piezoelectric signals in the electric signals offset or cancel each other, since the initial ultrasonic waves transmitted by the transmitter have opposite phases.

The processing device may be an oscilloscope having a memory for storing data on the electric signal. Preferably, the processing device may have a central processing unit.

In the present invention, the removal of the piezoelectric signal depends on the symmetry of the pair of ultrasonic waves sent by the transmitter, the symmetry in terms of polarity in converting ultrasonic waves into the electric signal by the acoustoelectric, ultrasonic transducer, and linearity in processing the electric signal. Therefore, the symmetry and the linearity are preferably satisfactory.

Preferably, the signal generator has a highly symmetric electric signal in terms of polarity. Preferably, the transmitter has high symmetry in converting the electric signal to the ultrasonic waves. However, where this is not the case, the electric signal generated by the signal generator may be adjusted so as to compensate the input-output characteristics of the transmitter.

In the present invention, a pair of the ultrasonic waves may be generated by a pair of electric oscillators. An input voltage to the electric oscillator may be adjusted to compensate for the difference between the electric oscillators so as to improve the symmetry of ultrasonic waves sent by the transmitter.

Alternatively, the receiving device may compensate for the non-linearity of ultrasonic waves. For example, a pair of amplifiers may be disposed between the acoustoelectric, ultrasonic transducer and the processing device, and the amplifiers have a different amplifying rate, corresponding to the pair of ultrasonic waves so as to compensate for the asymmetry. Alternatively, the processing device may compensate for the difference in the symmetry in electric signals so as to improve the removal of the piezoelectric signal.

DETAILED DESCRIPTION OF THE PREFERRED EMBODIMENTS

Figure 1:
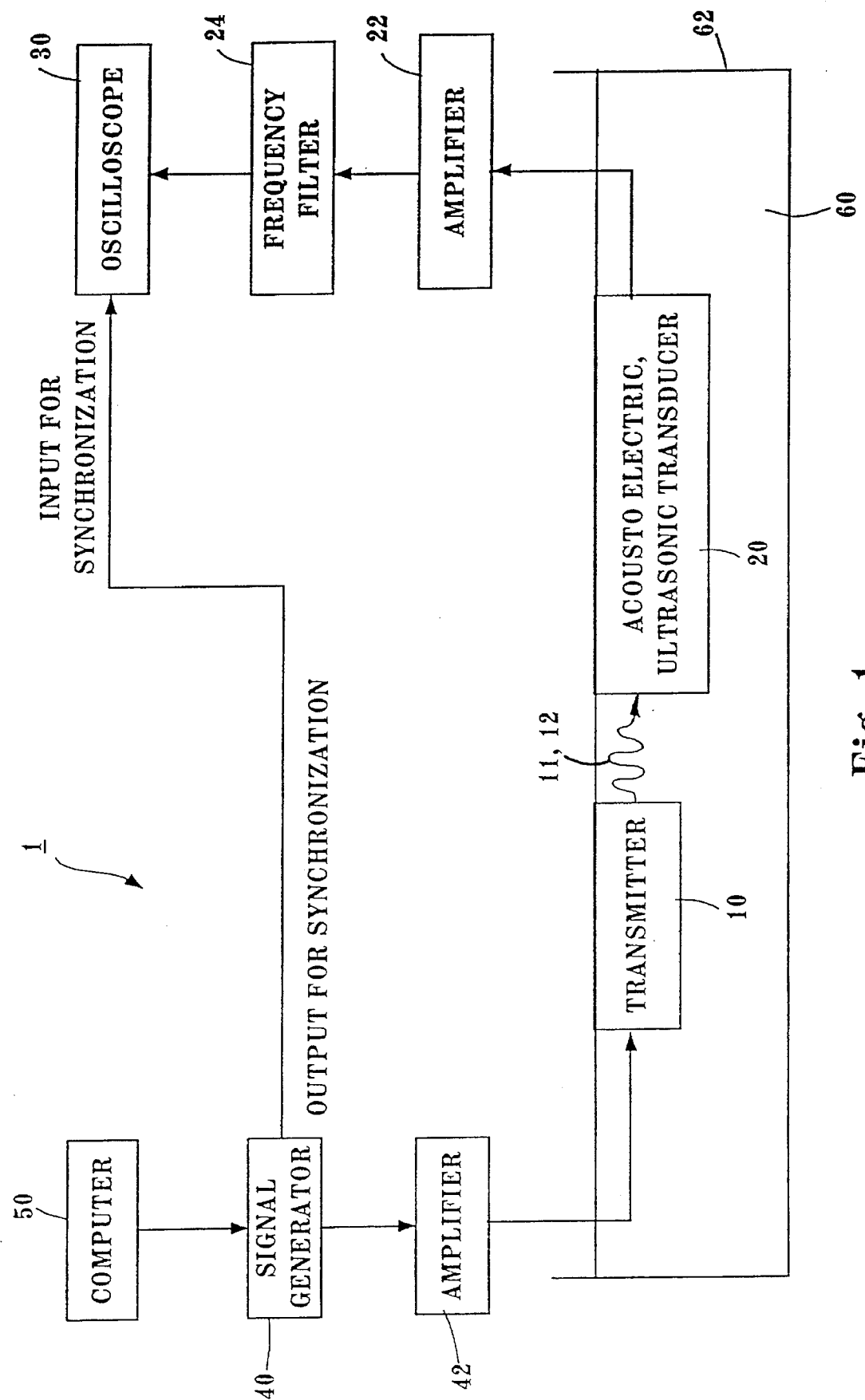
FIG. 1 is a block diagram of one embodiment of the apparatus of the present invention.

In FIG. 1, an ultrasonic apparatus 1 of the present invention has a transmitter 10 for transmitting ultrasonic waves to a sample. The transmitter 10 may have a piezoelectric transducer converting the electric signal into ultrasonic waves.

The ultrasonic waves may have a single frequency. Alternatively, the ultrasonic waves may have a mixture of frequencies. Frequencies of the ultrasonic waves depend on the sample. For example, ultrasonic waves may range from 50 to 100 KHz for concrete, from 0.1 to 1 MHz for synthetic resin such as tires, from 0.4 to 1 MHz for cast iron, from 1 to 5 MHz for living organisms, from 1 to 10 MHz for iron and steel, and from 10 to 50 MHz for a ceramic material.

An acoustoelectric, ultrasonic transducer 20 receives ultrasonic waves affected by the sample, and the transducer 20 converts the ultrasonic waves into an electric signal. The acoustoelectric, ultrasonic transducer 20 may be a single crystal of zinc oxide as disclosed in U.S. Pat. No. 5,345,427 or a single crystal of cadmium sulfide.

A digital oscilloscope 30 may have a screen for showing an electric signal. The oscilloscope may have a memory for storing data on the electric signal. A pair of electric signals are supplied to the oscilloscope 30 one by one, and the memory may store the data on the earlier electric signal at least until the later electric signal is received. At the time of receiving the later electric signal, the later electric signal may be added to the earlier electric signal. The memory may be a random access memory, a hard disk, a floppy disk, a magnetooptic device, a compact disk, etc. Alternatively, instead of the oscilloscope, a computer may process the electric signal.

Upon the direction from a computer 50 a signal generator 40 generates an electric signal, and an amplifier 42 amplifies the electric signal from the signal generator 40. In one embodiment of the present invention, the signal generator 40 may be capable of converting the electric signal to another electric signal having an opposite waveform with respect to zero voltage.

The signal generator 40 may supply an electric signal serving as a trigger to the oscilloscope 30 so that, after an appropriate period from receiving the trigger signal, the oscilloscope starts to process electric signals.

An amplifier 22 amplifies electric signals from the receiver 20. A frequency filter 24 removes electric signals having higher frequencies and passes electric signals having lower frequencies.

In FIG. 1, a container 62 contains water 60, and the transmitter 10 and the transducer 20 are immersed in the water 60 so that ultrasonic waves 11, 12 go through the water 60 so as to reach the transducer 20. However, the container 62 and the water 60 are not elements of the ultrasonic apparatus of the present invention.

The followings are the operation of the ultrasonic apparatus 1. Upon direction from computer 50, signal generator 40 generates a first electric signal having a waveform, for example, a so-called sine burst wave. Subsequently, signal generator 40 generates a second electric signal having a waveform opposite to that of the first electric signal with respect to zero voltage. The superimposition of the first signal and the second signal would nullify the signals.

The electric signals are amplified by a amplifier 42 and supplied to a transmitter 10. The first electric signal is supplied to transmitter 10, and transmitter 10 converts the first electric signal into first ultrasonic waves. After transmitter 10 transmits the first ultrasonic waves, transmitter 10 then transmits second ultrasonic waves.

Figure 2E:
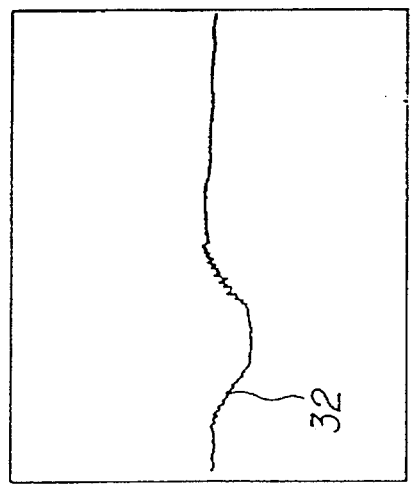
FIG. 2(e) shows the acoustoelectric signal upon superimposing the pair of the electric signals.
Figure 2C:
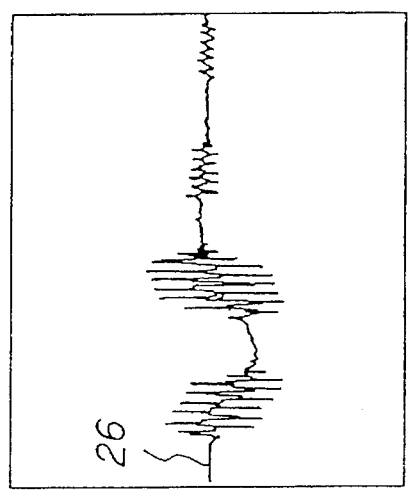
FIGS. 2(c) and 2(d) show a pair of electric signals converted by the acoustoelectric, ultrasonic transducer.
Figure 2D:
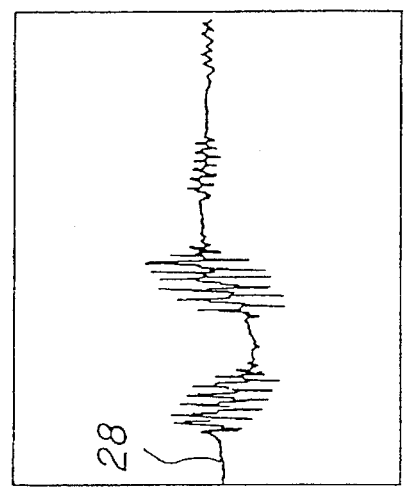
Figure 2A:
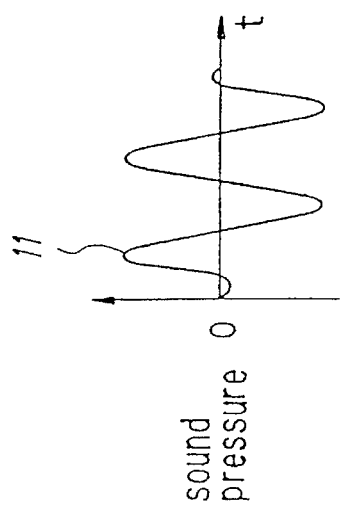
FIGS. 2(a) and 2(b) show a pair of ultrasonic waves having substantially symmetric waveform with respect to zero sound pressure.
Figure 2B:
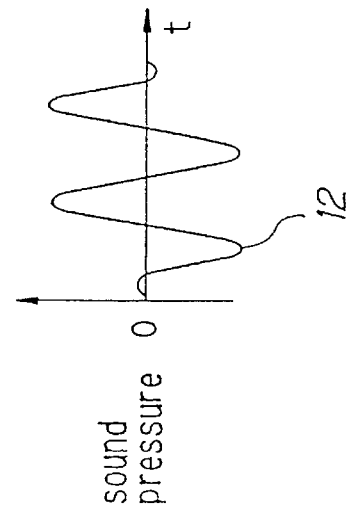

FIGS. 2(a) and 2(b) show the waveform of the first ultrasonic waves 11 and the second ultrasonic waves 12, respectively. The horizontal axes are time, and the vertical axes are sound pressure. The first ultrasonic waves 11 and the second ultrasonic waves 12 have substantially symmetric waveforms with respect to zero sound pressure. The first electric signal and the second electric signal have a symmetric waveform with respect to zero voltage so that upon conversion by transmitter 10 the first ultrasonic waves 11 and the second ultrasonic waves 12 have substantially symmetric waveforms with respect to a zero sound pressure.

Alternatively, after the first ultrasonic waves are sent to the sample a few times, the second ultrasonic waves are sent to the sample the same number of times as the first ultrasonic waves. Each of the first ultrasonic waves is separated from the other first ultrasonic waves, and each of the second ultrasonic waves is separated from the other second ultrasonic waves.

In FIG. 1, a sample is not present, and the ultrasonic waves 11, 12 are sent though water 60 to acoustoelectric, ultrasonic transducer 20. When a sample is present, the ultrasonic waves are affected by a sample. The ultrasonic waves may reflect on a surface of the sample. Alternatively, the ultrasonic waves may refract on the sample, propagating through the sample. The ultrasonic waves may also propagate on a surface of the sample.

When a sample is present, the sample may be arranged between transmitter 10 and acoustoelectric, ultrasonic transducer 20 so as to receive ultrasonic waves propagating though the sample. Alternatively, transmitter 10 and acoustoelectric, ultrasonic transducer 20 may be present on the same side of the sample so as to receive ultrasonic waves reflected by the sample. The latter arrangement is called a pulse-echo method.

Transducer 20 receives a pair of ultrasonic waves and converts the pair of ultrasonic waves into a pair of electric signals 26, 28. FIGS. 2(c) and 2(d) show the waveforms of the first electric signal 26 and the second electric signal 28, respectively. The horizontal axes are time, and the vertical axes are voltage. Each of the electric signals 26, 28 is a superimposition of an acoustoelectric signal, which corresponds to a shift in the baseline, and a piezoelectric signal, which corresponds to rapid vibrations. The rapid vibrations in the electric signal 26 are opposite in phase to the rapid vibrations in the electric signal 28.

The electric signals 26, 28 are amplified by amplifier 22, and a frequency filter 24 removes higher frequency components in the electric signals.

The oscilloscope 30 superimposes the electric signal 26 and the electric signal 28 so as to offset and remove the piezoelectric signals having rapid vibrations. FIG. 2(e) shows the acoustoelectric signal 32 upon the superimposition. The horizontal axis is time, and the vertical axis is voltage. In FIG. 2(e), the piezoelectric signal having rapid vibration is removed.

In the aforementioned embodiment, the device 40 generates a pair of electric signals having substantially symmetric waveforms with respect to zero voltage. However, the pair of electric signals can be generated by other devices.

Figure 3A:
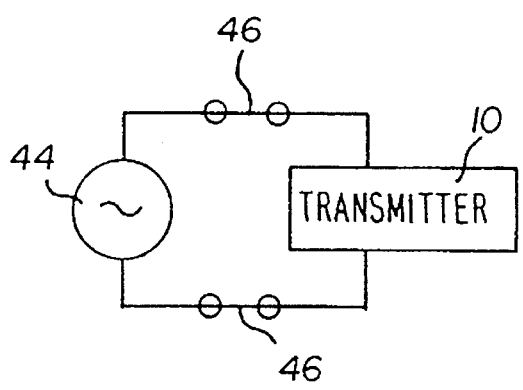
FIGS. 3(a) and 3(b) show an electric circuit for generating a pair of electric signals having substantially symmetric waveform with respect to zero voltage.
Figure 3B:
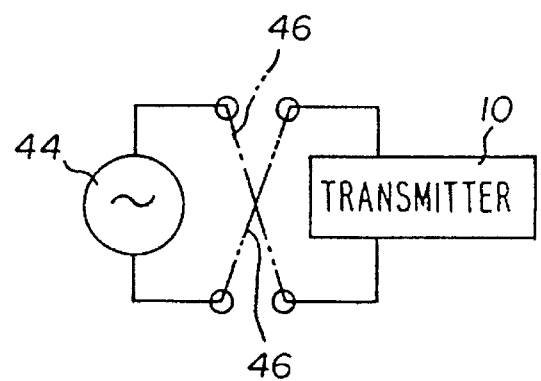

In FIGS. 3(a) and 3(b), an electric circuit includes a transmitter 10 for sending ultrasonic waves, a unipolar generator 44, and a switch 46 for directing electric current. The unipolar generator 44 produces an electric signal, and the switch 46 can change connections so as to convert the phase of electric signals to opposite. Then, the electric signal is sent to transmitter 10. The electric signals supplied to transmitter 10 in each of FIGS. 3(a) and 3(b) a substantially symmetric waveform with respect to zero voltage. Alternatively, an electric circuit may have two unipolar generators generating electric signals having opposite phase.

In the aforementioned embodiments, a pair of electric signals having opposite phases are supplied to transmitter 10. However, in another embodiment of the present invention, electric signals having the same phase may be supplied to the transmitter, and the transmitter may produce a pair of ultrasonic waves having opposite phases.

Figure 4C:
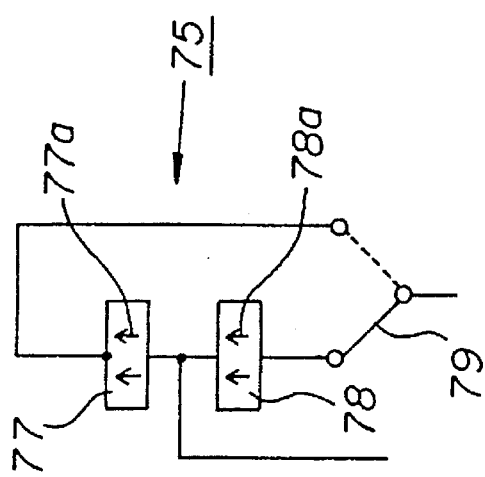
FIGS. 4(a), 4(b) and 4(c) show an electric circuit for generating a pair of ultrasonic waves having substantially symmetric waveform with respect to zero pressure.
Figure 4B:
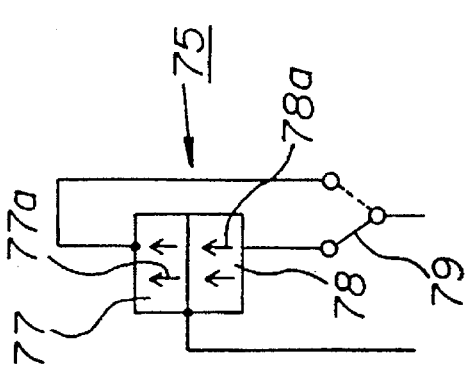
Figure 4A:
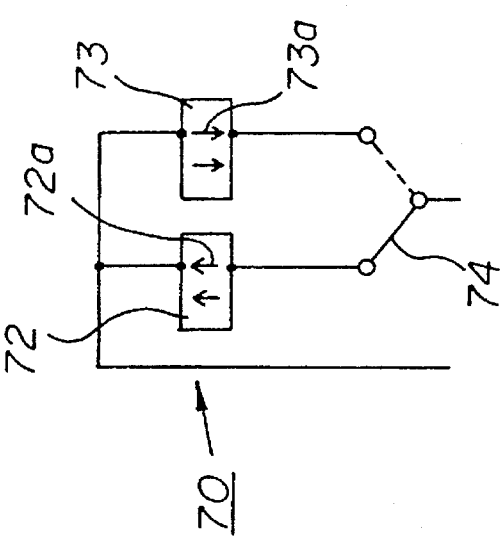

In FIG. 4(a), a transmitter 70 has a pair of piezoelectric transducers 72, 73 that connect electric signals into ultrasonic waves. Upon supplying an alternating voltage, each of the piezoelectric transducer 72, 73 may vibrate at the same frequency as that of the alternating voltage so as to send ultrasonic waves having the same frequency.

Piezoelectric transducer 72 has the same size and properties as piezoelectric transducer 73. However, the pair of piezoelectric transducers 72, 73 are connected to the electric circuit so that the direction 72a of the piezoelectric polarization in the piezoelectric transducer 72 is opposite to the direction 73a of the piezoelectric polarization in the piezoelectric transducer 73. Therefore, ultrasonic waves produced by piezoelectric transducers 72 and 73 have a substantially symmetric waveform with respect to a zero sound pressure A switch 74 changes connections to either piezoelectric transducer 72 or piezoelectric transducer 73.

In FIG. 4(a), piezoelectric transducer 72 is spatially arranged side by side with piezoelectric transducer 73. In FIG. 4(b), piezoelectric transducer 77 is spatially laminated onto piezoelectric transducer 78. The electric circuit of FIG. 4(b) is equivalent to the electric circuit of FIG. 4(c).

In FIGS. 4(b) and 4(c), a transmitter 75 has a pair of piezoelectric transducers 77, 78 having the same size and properties. The directions of piezoelectric polarization are shown by arrows 77a and 78a. A switch 79 changes connections to either piezoelectric transducer 78 or piezoelectric transducer 79.

In the present invention, computer 50, amplifier 42, another amplifier 22, and frequency filter 24 are not essential elements.

EXAMPLE

Example 1 and Comparative Example 1 were carried out in the ultrasonic apparatus 1 shown in FIG. 1. In Example 1, signal generator 40 produced a pair of sine burst waves having symmetric waveforms with respect to zero voltage. Contrarily, in Comparative Example 1, signal generator 40 did not produce a pair of sine burst waves, but rather produced single sine burst wave. The following are detailed experimental conditions for Example 1 and Comparative Example 1.

Signal generator 40 generated a sine burst wave having a frequency of 10 MHz. In Example 1, signal generator 40 reversed the polarity of the sine burst wave so as to produce another sine burst wave having a waveform symmetric to the former sine burst wave with respect to zero voltage. Amplifier 42 amplified the pair of the sine burst waves from signal generator 40 by twenty times. Amplifier 42 can generate voltage as much as 70 volts in amplitude in alternating current. Transmitter 10 included an oscillator made of a piezoelectric device for producing ultrasonic waves having frequency of 10 MHz. Receiver 20, serving as an acoustoelectric, ultrasonic transducer, had a single crystal of cadmium sulfide having dimensions of 5 mm and a thickness of 1 mm for receiving ultrasonic waves. Receiver 20 further had a buffer amplifier having high impedance. The single crystal of cadmium sulfide converts ultrasonic waves into electric signals. Amplifier 22 had a gain of 20 dB. Frequency filter 24 removed ultrasonic waves having frequencies higher than 2 MHz, and had an efficiency of 24 dB/OCT.

A digital oscilloscope 30 had a memory for storing data on electric signals and a device for averaging aquisitions of the electric signals. In Example 1, the pair of electric signals were added so as to cancel the piezoelectric signal.

Water 60 fills a space between the transmitter 10 and the receiver 20; no sample was present in the water.

Figure 5:
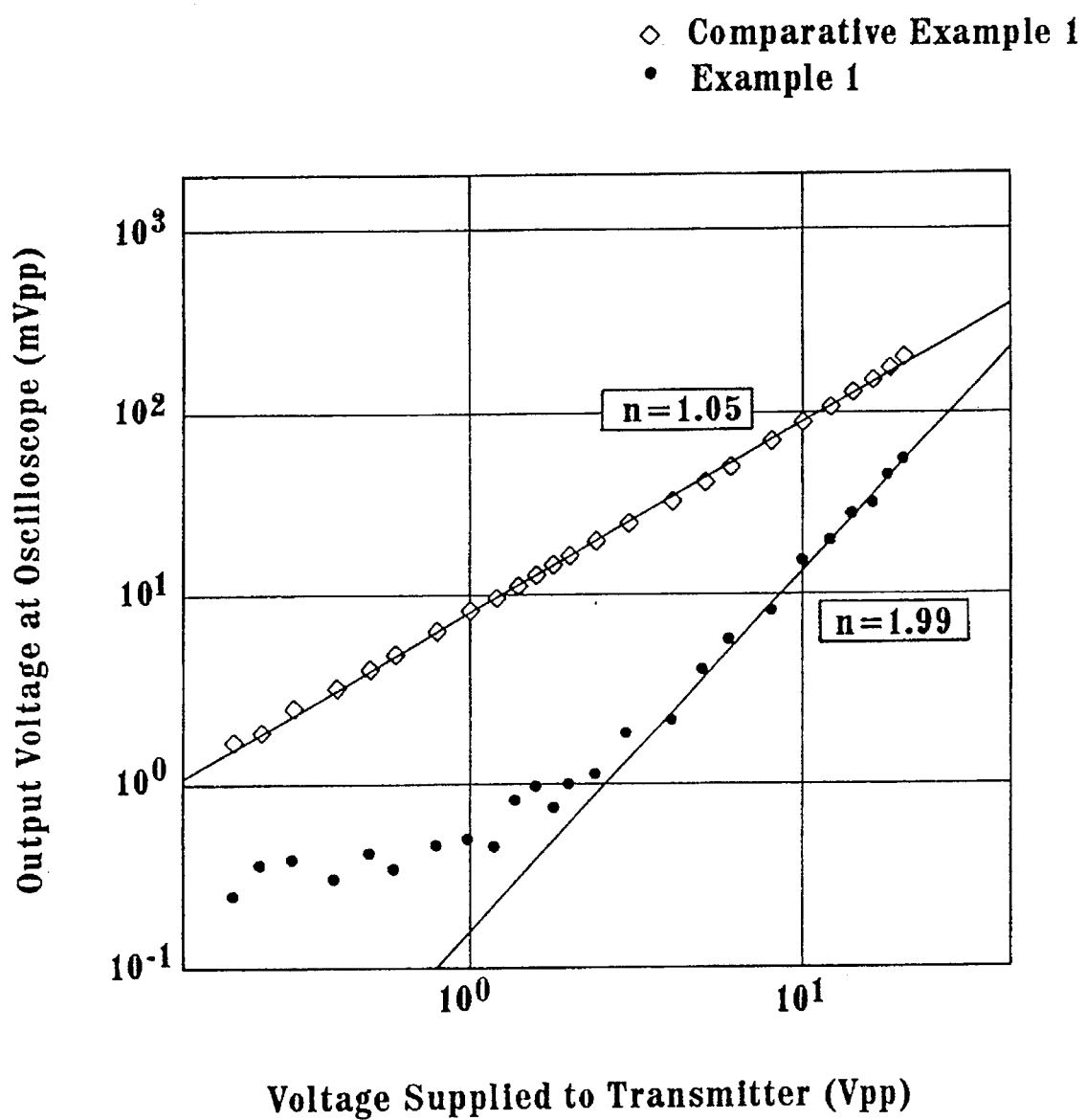
FIG. 5 shows correlation between the voltage supplied to the transmitter from the amplifier and the output voltage at the oscilloscope in the apparatus of the present invention.

FIG. 5 shows correlation between the voltage supplied to transmitter 10 from amplifier 42 and the output voltage at oscilloscope 30. In Example 1, the output voltage at oscilloscope 30 is approximately proportional to the square of the voltage supplied to the transmitter 10, suggesting that the processed electric signal is the acoustoelectric signal insensitive to phase. In contrast, in Comparative Example 1, the output voltage at oscilloscope 30 is approximately proportional to the voltage supplied to transmitter 10, suggesting that the processed electric signal is the piezoelectric signal sensitive to phase. In Example 1, compared to Comparative Example 1, the piezoelectric signal is removed, and the acoustoelectric signal is selectively obtained.

In the present invention, a transmitter sends a pair of ultrasonic waves having substantially symmetric waveforms with respect to zero sound pressure, and a processing device processes the pair of electric signals so as to remove the piezoelectric signal sensitive to phase, thereby selectively obtaining the acoustoelectric signal insensitive to phase. The present invention is independent of homogeneity of the sound pressure and a surface of the acoustoelectric, ultrasonic transducer for receiving ultrasonic waves, and the present invention can be applied to the so-called pulse-echo method. Even when the acoustoelectric signal has a similar frequency to that of the piezoelectric signal, the ultrasonic apparatus of the present invention can remove the piezoelectric signal sensitive to phase, thereby improving time resolution.

It is to be understood that various alterations, modifications and/or additions which may occur to those skilled in the art may be made to the features of possible and preferred embodiments of the invention as herein described without departing from the spirit and scope of the invention as defined in the claims.

What is claimed is:

1. An apparatus for transmitting and receiving ultrasonic waves comprising:
   a transmitter for sending a first pair of ultrasonic waves to a sample, the first pair of ultrasonic waves being separated from one another and having substantially symmetric waveforms with respect to zero sound pressure;
   an acoustoelectric, ultrasound transducer for receiving a second pair of ultrasonic waves affected by the sample, said acoustoelectric, ultrasonic transducer converting the second pair of ultrasonic waves into a pair of first electric signals accompanied by phonon-charge carrier interaction, each of the first electric signals including an acoustoelectric signal and a piezoelectric signal; and
   a processing device for processing the pair of first electric signals so as to remove the piezoelectric signal and obtain the acoustoelectric signal.

2. The apparatus of claim 1, further comprising a signal generating device for generating second electric signals which are supplied to said transmitter, and said transmitter comprises a piezoelectric transducer for converting the second electric signals into said first pair of ultrasonic waves.

3. The apparatus of claim 2, wherein said second electric signals are separated from one another and have substantially symmetric waveforms with respect to zero voltage.

4. The apparatus of claim 2, further comprising a switch connecting said signal generating device and said transmitter, for changing connections between said signal generating device and said transmitter so as to alternate polarity of the second electric signals.

5. The apparatus of claim 2, wherein said transmitter includes a pair of piezoelectric transducers for converting the second electric signals into ultrasonic waves, and a switch for changing connections of said signal generating device to one of said piezoelectric transducers, said piezoelectric transducers having opposite polarity so that the first pair of ultrasonic waves produced by said pair of piezoelectric transducers have substantially symmetric waveforms with respect to zero sound pressure.

6. The apparatus of claim 1, wherein said processing device includes a memory for storing data relevant to the first electric signals.

7. The apparatus of claim 1, wherein said processing device comprises a central processing unit.

8. The apparatus of claim 1, wherein said processing device comprises an oscilloscope.

9. The apparatus of claim 2, wherein said signal generating device supplies a third electric signal, serving as a trigger, to said processing device.

10. The apparatus of claim 1, wherein said acoustoelectric, ultrasonic transducer comprises a single crystal of zinc oxide.

11. The apparatus of claim 1, wherein said first pair of ultrasonic waves have substantially the same shape and opposite polarity.

12. The apparatus of claim 3, wherein said second electric signals have substantially the same shape and opposite polarity.

13. A method for transmitting and receiving ultrasonic waves comprising the steps of:
   sending a first pair of ultrasonic waves to a sample, the first pair of ultrasonic waves being separated from one another and having substantially symmetric waveforms with respect to zero sound pressure;
   receiving a second pair of ultrasonic waves affected by the sample;

converting the second pair of ultrasonic waves received into a pair of first electric signals by an acoustoelectric, ultrasonic transducer accompanied by phonon-charge carrier interaction, each of the first electric signals including an acoustoelectric signal and a piezoelectric signal; and processing the pair of first electric signals so as to remove the piezoelectric signal and obtain the acoustoelectric signal.

14. The method of claim 13, further comprising the steps of generating second electric signals and converting the second electric signals into said first pair of ultrasonic waves.

15. The method of claim 13, further comprising the steps of supplying a pair of second electric signals having substantially symmetric waveforms with respect to zero voltage, said second electric signals being separated from one another; and converting the pair of second electric signals into the first pair of ultrasonic waves.

16. The method of claim 15, wherein the supplying step comprises a step of switching so as to alternate polarity of the second electric signals.

17. The method of claim 13, wherein the converting step comprises a step of switching polarity of the pair of ultrasonic waves.

18. The method of claim 13, further comprising, after the processing step, a step of displaying the acoustoelectric signals on a screen.

19. The method of claim 13, wherein the processing step comprises a step of superimposing the pair of first electric signals.

20. The method of claim 13, wherein said first pair of ultrasonic waves have substantially the same shape and opposite polarity.

* * * * *